United States Patent [19]
Field et al.

[11] Patent Number: 5,249,030
[45] Date of Patent: Sep. 28, 1993

[54] METHOD AND APPARATUS FOR DETERMINING THE POSITION OF A MOVING BODY AND THE TIME OF THE POSITION MEASUREMENT

[75] Inventors: Alan H. Field, Essex; Joseph Bakach, Bridgeport, both of Conn.

[73] Assignee: Zygo Corporation, Middlefield, Conn.

[21] Appl. No.: 804,896

[22] Filed: Dec. 6, 1991

[51] Int. Cl.$^5$ ............................................... G02B 9/02
[52] U.S. Cl. ..................................... 356/349; 356/358
[58] Field of Search ............................... 356/349, 358

[56]  References Cited
U.S. PATENT DOCUMENTS 4,688,940 8/1987 Sommargren et al. ............. 356/349

*Primary Examiner*—Vincent P. McGraw
*Attorney, Agent, or Firm*—Cohen, Pontani, Lieberman, Pavane

[57] ABSTRACT

A pair of orthogonally polarized optical beams that differ in frequency by a constant oscillator-generated reference frequency are directed through and traverse respective fixed and variable length paths of a heterodyne interferometer, following which the beams are mixed and directed to a detector that generates an electrical measurement signal having a phase that varies with changes in the variable path length. Changes in the measurement signal phase are determined by counting cycle-to-cycle phase changes of the reference frequency signal between sampling instants defined by time-spaced occurrences of a known phase of the measurement signal. The resulting count is simultaneously used to determine both changes in length of the variable length path and the elapsed time interval between the sampling instants. Each of the change in path length and elapsed time interval determinations are accumulated over an extended plurality of sampling instant pairs to provide the current path length and the time of the final measurement of path length change.

42 Claims, 3 Drawing Sheets

METHOD AND APPARATUS FOR DETERMINING THE POSITION OF A MOVING BODY AND THE TIME OF THE POSITION MEASUREMENT

FIELD OF THE INVENTION

The present invention relates to methods and apparatus for measuring changes in length or position and for further determining the time of the length or position measurement and, more particularly, to interferometer-based arrangements providing enhanced certainty and accuracy in the measurement time determination.

BACKGROUND OF THE INVENTION

The use of interferometry to measure changes in position, length, distance or optical length is well known. Rapidly increasing demands and needs for higher accuracy determinations of the precise time at which such interferometric measurements are taken have fueled numerous efforts to reduce and minimize the various sources of uncertainty that are inherent in currently known methods and apparatus for calculating position measurement times. These prior art procedures have primarily focussed on carefully controlling the time measurement delays so as to enable reliance upon predetermined extrapolation constants with which the actual time measurements taken are modified or corrected so as to achieve apparently enhanced accuracy. Such procedures, however, are complex and expensive and are themselves subject to external, substantially uncontrolled forces such, for example, as wear of mechanical parts and age and thermally-induced operational drift in the measurement electronics.

SUMMARY OF THE INVENTION

The present invention provides a method and apparatus for accurately providing the time of a length or position measurement by directly measuring the time of the measurement using the same timebase-derived data from which the position measurement is taken. In a currently preferred embodiment, the time determination is achieved in conjunction with a prior art heterodyne interferometer apparatus that is operable to provide an electrical measurement signal which varies in accordance with changes in position of an element, such for instance a movable retroreflector, of the interferometer. The movable retroreflector forms a part of a variable length path that is traversed by a first optical beam, and the interferometer further provides a fixed length path that is traversed by a second optical beam, the first and second beams being relatively orthogonally polarized and being separated in frequency by an oscillator-generated reference frequency. After emerging from the interferometer, the beams are mixed and the mixed beams are applied to a detector which generates the measurement or interference signal.

In accordance with the present invention, phase changes of the measurement signal with respect to the reference signal are measured, preferably by electronic circuits that monitor the change in phase of the reference frequency signal with respect to a known phase of the measurement signal. Such measurements are collected at each cycle of the measurement signal. The number of phase changes of the reference signal between sampling instants defined by the time-spaced or successive occurrences of the known phase of the measurement signal indicates the change of position of the movable retroreflector element of the interferometer between those sampling instants. Moreover, since the period of the reference signal is constant and known, a count of the number of phase changes of the reference signal between the sampling instants is directly convertible, through straightforward calculation, to provide a measure of the elapsed time interval between the sampling instants. The positional change and time interval determinations for a plurality of pairs of successive time-spaced sampling instants can be attained by summing or accumulating the individual sampling instant pair determinations, as for example in a series of adders and/or logic gates, so as to provide total positional change and the actual time at a last or current sampling instant.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements throughout the several views.

DETAILED DESCRIPTION OF THE PREFERRED EMBODIMENT

Figure 1:
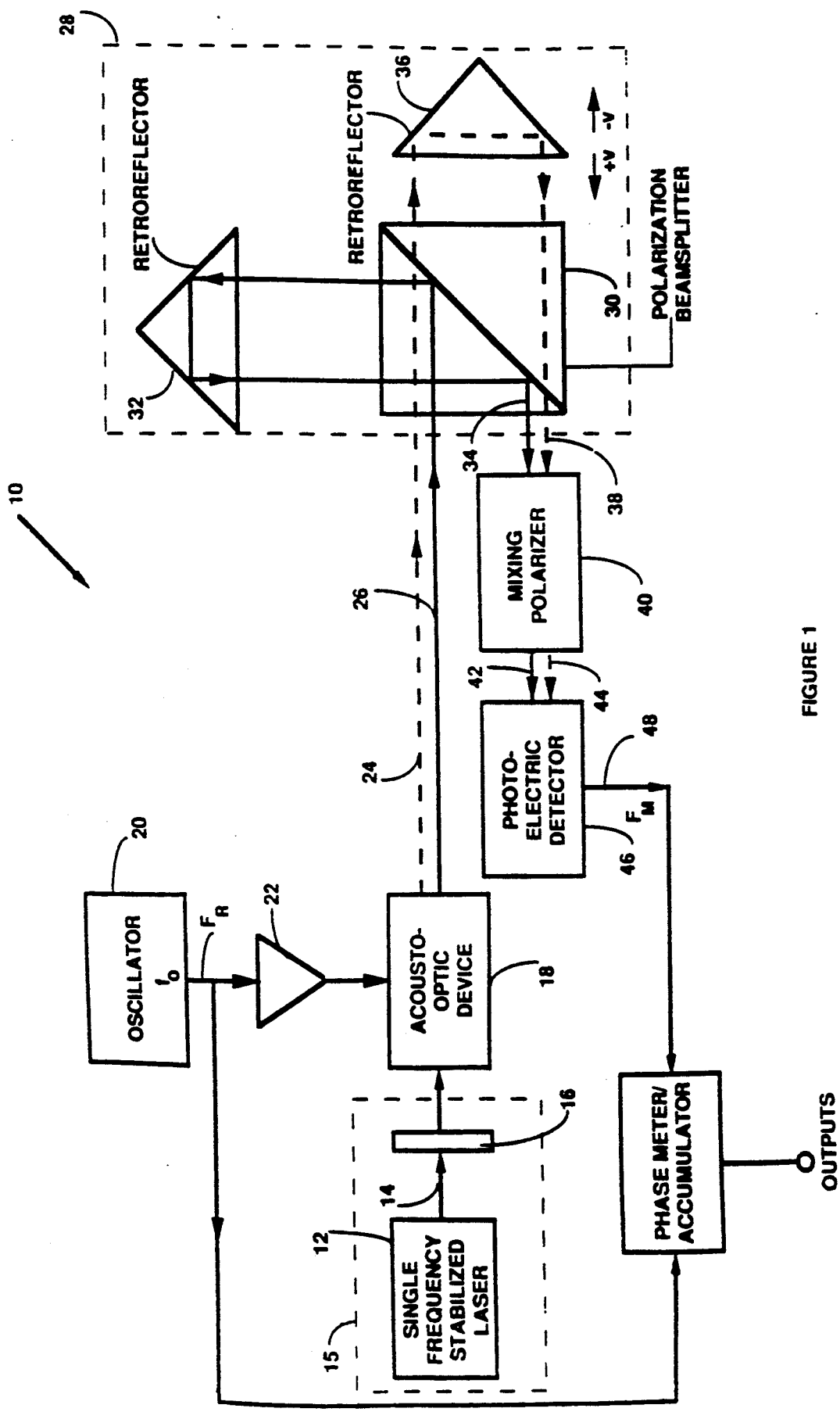
FIG. 1 is a schematic representation of a heterodyne interferometer system constructed in accordance with and incorporating the improvement of the present invention.

The present invention is directed to an apparatus, preferably an interferometer system and most preferably a heterodyne interferometer system, which is operable for simultaneously measuring, at each sampling or measurement instant, both relative changes in position—as for example length or optical length—and, with great accuracy and heretofore-unattained certainty, the elapsed time interval between which the successive sample or position measurements are taken. The invention is further directed to a method of concurrently measuring relative changes in length or position and the time of each such measurement or the elapsed time interval between the measurements. In each instance, the position and time data are jointly and directly derived from the same underlying objective data developed, in the currently preferred embodiment herein disclosed, from periodic electrical signals produced in response to the interference of an measured phase differences between a pair of optical beams that are output from an interferometer such, for example, as a polarization beam splitter type interferometer. More particularly, determination of the time-varying length or position of interest, or of changes in that length or position between sampling instants, is developed by ascertaining phase changes of a frequency stabilized reference electrical signal between the sampling instants which are defined by time-spaced or successive occurrences of a known phase of an electrical measurement signal; this measurement signal is produced in response to the interference of the interferometric optical beams that are output from the interferometer, and varies with the time-varying length or position to be determined. The known frequency characteristics of the reference electrical signal are concurrently used, in accordance with the invention, to simultaneously determine the time of each sampling instant with great accuracy and virtually without degradation by the multiple bases of uncertainty inherent in prior art arrangements for determining the exact time of an interferometric position measurement.

In a currently preferred arrangement, the improvement of the invention is applied to and practiced in conjunction with a heterodyne interferometer system such, for example, as that disclosed in U.S. Pat. No. 4,688,940 to Sommargren et al, issued Aug. 25, 1987. Accordingly, the basic interferometer system in connection with which the present invention is now disclosed is here described somewhat broadly and without unnecessary detail, and additional details thereof can be found in said Sommargren patent; toward that end, the entire disclosure and contents of U.S. Pat. No. 4,688,940 are expressly incorporated by reference herein and, as such, thus form a part hereof. It should nevertheless be understood that the application of the inventive improvement to the interferometer system of the Sommargren patent is intended to be taken by way of example only and, indeed, the improvement is equally applicable to and in conjunction with a wide range of radiation sources and devices using radiant energy—i.e. electromagnetic energy of all frequency ranges—including and iun addition to optical measuring systems.

With initial reference to FIG. 1, a diagrammatically-presented heterodyne interferometer system of the general type disclosed in the Sommargren patent is there shown and identified by the general reference numeral 10. A light source 12, most preferably a laser, generates a linearly polarized beam 14 of optical energy having a single, stabilized frequency. Depending upon the specific type and construction of the source 12 and the required diameter and divergence of its output beam 14, the optical beam from the light source may be passed through integral (as indicated by the dashed box 15) or otherwise suitably situated or associated beam forming optics 16 before being directed to an acousto-optic (A-O) device 18 such, for example, as one comprising a Bragg cell, a beam-combining prism, an aperture and a telescope. The acousto-optic device 18 is driven by a crystal-driven or other electronic oscillator 20 or like source of a fixed frequency or frequency-stabilized reference electrical signal $F_R$ of frequency $f_o$ that provides a fixed frequency time base and is applied to the A-O device 18 through a power amplifier 22.

The acousto-optic device, as is well known, can be made to responsively produce and output a pair of substantially equal intensity optical beams 24, 26 that differ in frequency from each other by $f_o$, i.e. by the frequency of the stabilized reference electrical signal $F_R$ generated by oscillator 20. These beams, each containing both horizontal and vertical polarizations, are then converted to one beam of horizontal polarization and one beam of vertical polarization, the frequency of these orthogonally-polarized beams differing by $f_o$, as by way of example disclosed in the Sommargren '940 patent. The frequency $f_o$ may, for example, be on the order of 20 megahertz. The optical beams 24, 26 are, moreover, collinear although they are shown in FIG. 1, for clarity and convenience of illustration, as being slightly transversely displaced from each other.

The orthogonally polarized beams 24, 26 are applied to an interferometer 28 as, for example, a polarization beam splitter type device. In the illustrated device 28, a polarization beamsplitter 30 reflects completely the s polarized light, i.e. light with its polarization vector perpendicular to the plane of incidence, of the incoming beam 26 which is thereby reflectedly directed to a first retroreflector 32. Retroreflector 32 retroreflects the s polarized beam back to the beamsplitter 30 at which the beam is once again reflected to define the output beam 34. Retroreflector 32 is positionally fixed relative to the beamsplitter 30 so as to define a fixed length path through the interferometer and that is traversed by the optical beam 26.

The beamsplitter 30 correspondingly transmits completely the p polarized light, i.e. light with its polarization vector in the plane of incidence, of the incoming beam 24 which is thereby passed through the beamsplitter to a second retroreflector 36. Retroreflector 36 retroreflects the beam 24 to return it to and once again through the beamsplitter 30 from which it emerges as output beam 38. The output beams 34 and 38 are, as the incoming beams 24, 26 to the interferometer 28, collinear and orthogonally polarized. The second retroreflector 36 is movable or displaceable relative to beamsplitter 30 and parallel to the incoming beam 24 in the opposed directions indicated by the arrows in FIG. 1 so as to define a variable length path of the optical beam 24. As the retroreflector 36 moves, the phase of the output beam 38 varies as a function of its displacement.

The output beams 34, 38 are directed to a mixing polarizer 40 that mixes the parallel and overlapping portions of the beams to provide each with a component of similar polarization. The resulting similarly polarized beams 42, 44 are appiled to a photoelectric detector 46, such as a photodiode, or the like to produce an electrical measurement or interference signal $F_M$ at its output 48. The signal $F_M$ has, at any given time, a phase term equal to the difference of a fixed phase angle of the beam 42 (from the fixed length path traversed by the beam 26) and the phase of the beam 44 (which varies with displacement of the second retroreflector 36). Thus, the phase of the signal $F_M$ varies as a function of changes in the relative position or displacement of the second retroreflector 36 or, in other words, with changes in the variable path length that is traversed by the incoming optical beam 24 to the interferometer 28.

The measurement signal $F_M$ and the reference signal $F_R$ are applied to and used by a phase meter/accumulator 50 to produce, as explained hereinbelow, an output that corresponds to the change in length of the variable length optical path of the interferometer at a sampling or measurement instant and, in particular accordance with the present invention, a separate and simultaneously-derived output corresponding, with unusual accuracy and certainty, to the time of the path length measurement of the sampling instant. Phase changes of the measurement signal $F_M$ are, more particularly, determined by comparing the phase of the measurement signal to the phase of the reference signal $F_R$ at predetermined sampling instants. These phase changes of the measurement signal relative to the reference signal are accumulated to indicate changes in position (i.e. path length) and elapsed sampling or measurement time. A currently preferred implementation of the phasemeter/accumulator 50 will now be described, by way of example, in conjunction with FIGS. 2 and 3.

Figure 2:
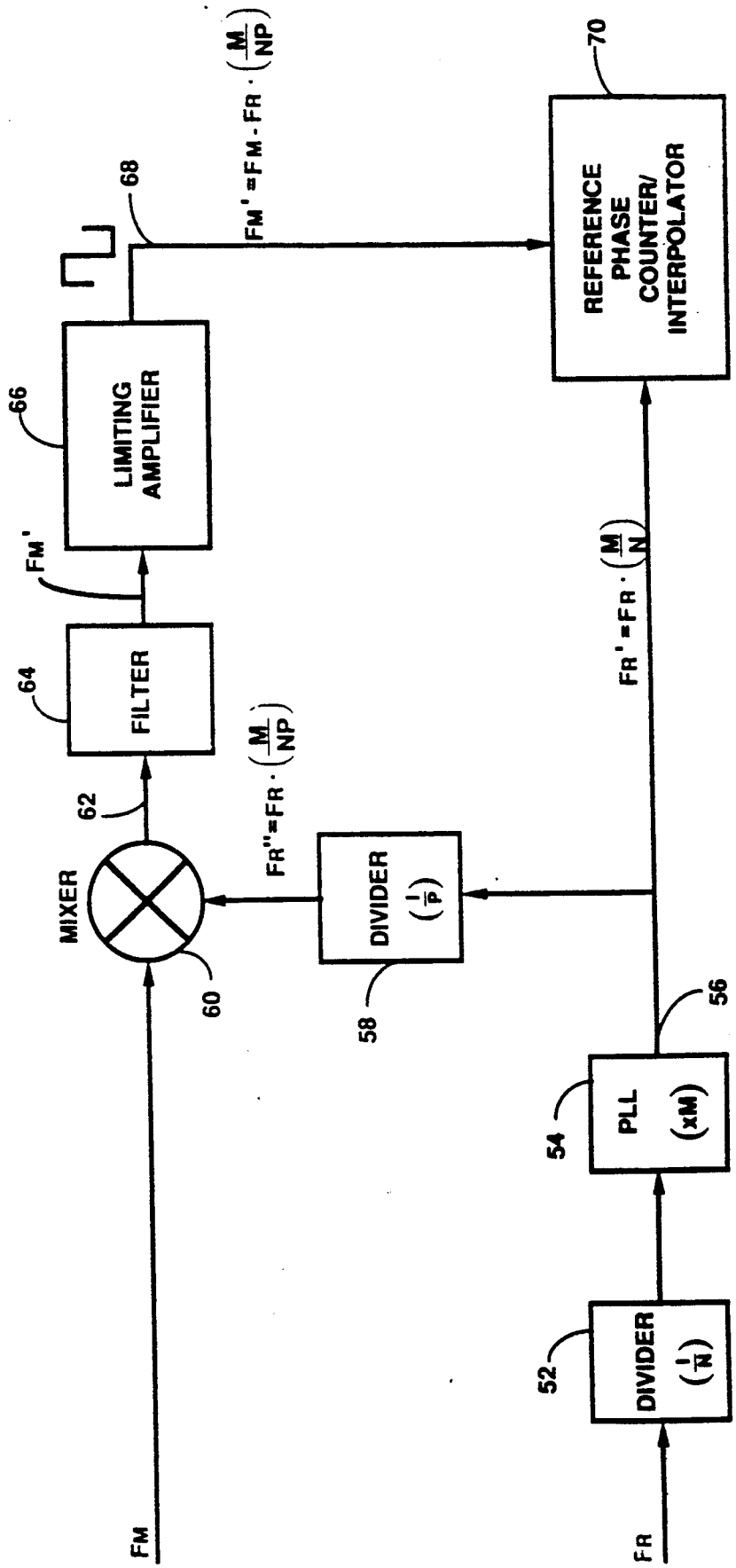
FIG. 2 is block diagram of the phase meter/accumulator of the interferometer system of FIG. 1.

An arrangement for measuring or determining changes in the phase of the measurement signal $F_M$ is depicted in FIG. 2. The oscillator-generated reference signal $F_R$ is fed to a frequency divider 52, at which the signal is divided by "N", and then to a frequency multiplier such as the phase locked loop (PLL) 54 at which the signal is multiplied by "M". The output 56 of the multiplier is a frequency-scaled reference signal $F_{R'}$ that is defined by the relation:

$$F_{R'} = F_R \cdot \frac{M}{N} \qquad \text{Equation 1}$$

The signal $F_{R'}$ from multiplier 54 is then fed to frequency divider 58, at which it is further divided by "P", to produce the intermediate reference signal $F_{R''}$:

$$F_{R''} = F_R \cdot M/NP \qquad \text{Equation 2}$$

In a currently preferred form of the invention, M=16, N=5 and P=4 and, assuming a reference oscillator frequency $f_o$ of 20 Megahertz, the scaled reference frequency $F_{R'}$ is 64 Megahertz and the intermediate reference frequency $F_{R''}$ is 16 Megahertz.

The intermediate reference signal $F_{R''}$ and the measurement signal $F_M$ are both next applied to a mixer 60, the output 62 of which is fed to and through a low pass filter 64. The output 62 of the mixer 60 contains both the sum and difference frequencies of the input signals $F_{R''}$ and $F_M$ and, after passing through the filter 64, the resulting intermediate measurement signal $F_{M'}$ contains only the difference term:

$$F_{M'} = F_M - F_R \cdot M/NP \qquad \text{Equation 3}$$

Thus, the mixer 60, in conjunction with the low pass filter 64, mixes the measurement signal frequency $F_M$ to an intermediate measurement frequency $F_{M'}$. The signal $F_{M'}$ is, in the embodiment herein described, a substantially constant frequency of 4 Megahertz plus or minus the Doppler frequency shift induced by relative motion of the interferometer retroreflector 34. The intermediate measurement signal $F_{M'}$ is then applied to a limiting amplifier 66 which generates at its output 68 a corresponding, substantially square wave digital signal at frequency $F_{M'}$. The digitized signal $F_{M'}$ from the amplifier 66 and the scaled reference signal $F_{R'}$ from the multiplier 54 are fed to a reference phase counter/interpolator 70 which measures the number of cycles of $F_{R'}$ between successive occurrences of a predetermined or otherwise known phase of the modified measurement signal $F_{M'}$.

Figure 3:
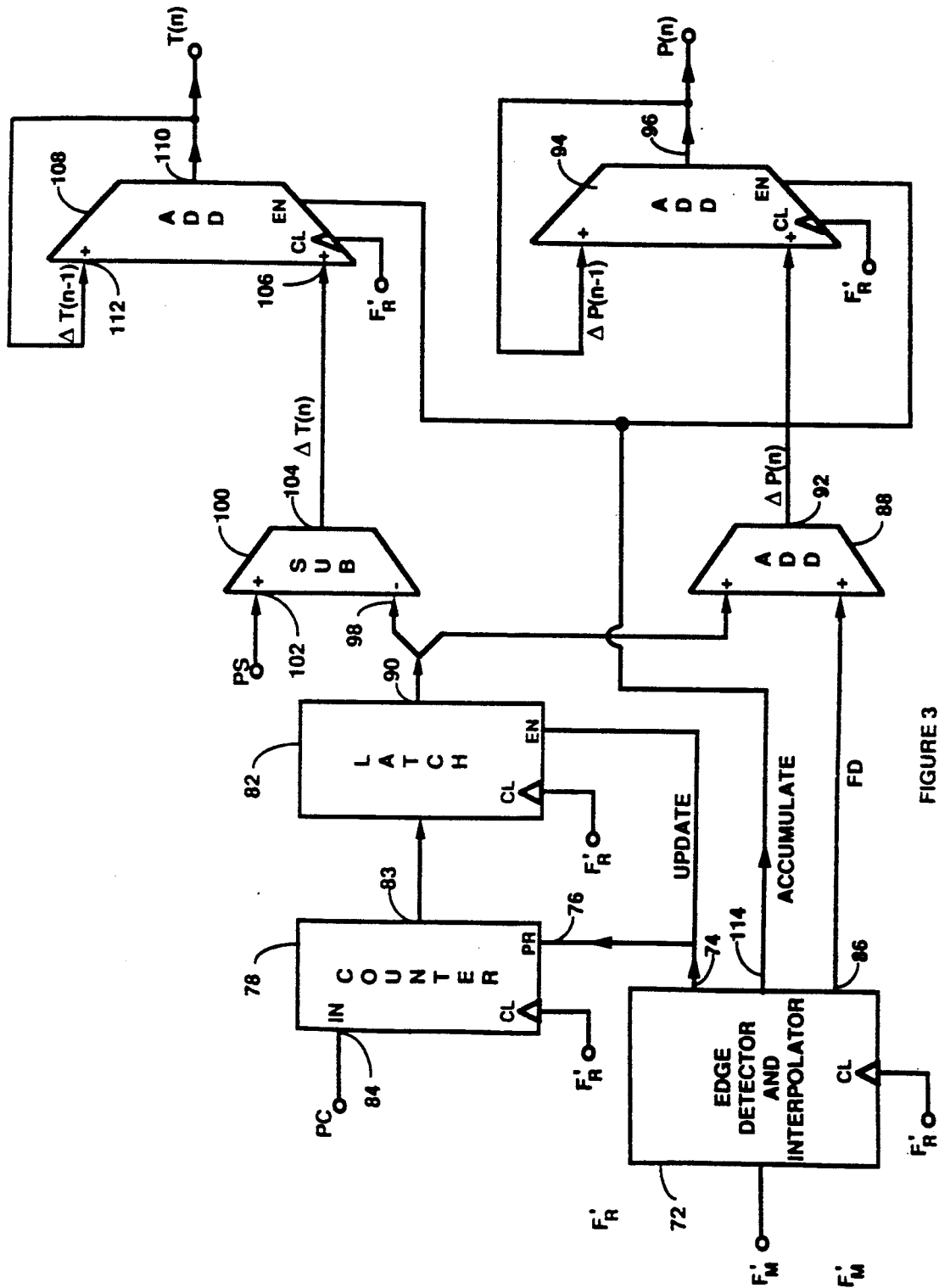
FIG. 3 is a semi-schematic block diagram of the reference phase counter/interpolator of FIG. 2.

A currently-preferred implementation of the reference phase counter/interpolator 70 may be seen in FIG. 3 in which, for convenience, it is again assumed that M=16, N=5 and P=4; those skilled in the art will nevertheless recognize that those selected values, as well as the aforementioned operating frequencies, are substantially matters of design choice and may, with suitable modifications (where appropriate) of the disclosed apparatus, be varied to accommodate specific intended applications and implementations of the invention. In any event, the signal $F_{M'}$ is first applied to an edge detector and interpolator element 72. The edge detector of element 72 detects each positive-going edge or zero crossing of the digitized waveform of $F_{M'}$ and, in response, makes its UPDATE logical output 74 true. The UPDATE enabling signal is fed to the PR (preset) input 76 of a down counter 78 and to the EN (enable) input 80 of a latching register or latch 82 that receives, as its input, the output (count) 83 of the counter 78. The counter also receives at its input 84 a preset count PC to which the counter is preset when the UPDATE signal applied to its PR input 76 goes true; in the hereindescribed embodiment of FIG. 3, the preset count PC equals decimal 15. Each of the edge detector and interpolator element 72, the counter 78 and the latch 82 are also synchronously clocked by the scaled reference signal $F_{R'}$, the signal $F_{R'}$ being fed to the CL (clock) input of each.

The interpolator of the element 72 operates to extend and enhance the resolution of the phase measurements by which changes in the variable path length or movable retroreflector position and the sampling time intervals are determined. Toward this end, the interpolator may be implemented by a multiply-tapped delay line which subdivides each cycle of the reference signal $F_{R'}$ into "Q" equally spaced segments having "Q" delay line outputs that are equally spaced at an output-to-output interval equal to 1/Q cycles of $F_{R'}$. In the embodiment of FIG. 3, and as is preferred, Q=8. The delay line of the element 72 may, by way of example, be implemented in substantially the manner disclosed in U.S. Pat. No. 4,332,475 to Demarest, issued Jun. 1, 1982, the entire contents of which are specifically incorporated by reference herein.

The input to the interpolator delay line is the modified measurement signal $F_{M'}$, and the delay line outputs—only "Q−1" of which are utilized in the form of the invention herein described—are sampled in accordance with the clock input to element 72 once at every cycle of the reference signal $F_{R'}$. These delay line outputs together with the undelayed signal $F_{M'}$ produce a code, as for example an 8-bit digital code, indicating the exact subinterval of the $F_{R'}$ cycle in which the $F_{M'}$ positive-going zero crossing detection occurred.

Since it is phase change that is pertinent to the determination of changes in position and time between successive sampling instants, the interpolator output 86 is the difference FD (fractional difference) of the two most recent interpolations and is fed to one input of an adder 88; where Q=8, the output 86 may consist of the 3 low order bits of the interpolation difference. The second or other input to the adder 88 receives the output 90 of the latch 82. As will hereinafter be apparent, the output 92 of the adder 88 is ΔP(n), the change in position of the retroreflector 36 (i.e. the change in the variable length path of the optical beam 24) between the current sampling instant "n" and the immediately preceding sampling instant "n−1". The adder output ΔP(n) is applied to one input of a synchronously-clocked position data accumulating adder 94, the output 96 of which is fed back to its second or other input. The adder 94 thus provides, at its output 96, the current update position P(n) of the retroreflector 36 as of the most recent measurement or sampling instant "n".

The output 90 of the latch 82 is also fed to one input 98 of a substractor 100 for subtraction from the data fed to its other input 102. That second, relatively positive input 102 receives a preset PS which, in the disclosed embodiment and implementation of the phase counter/interpolator 70, is set to decimal 16. The output 104 of the substractor 100 is a direct relative measure of the time interval ΔT(n) between the current sampling instant "n" and the immediately preceding sampling instant "n−1" and is applied to one input 106 of a synchronously clocked time data accumulating adder 108, the output 110 of the adder 108 being fed back to its other or second input 112. The time data accumulating adder output 110 thus provides a measure of the current updated time T(n) at the most recent measurement or sampling instant "n" relative to the beginning of (or, alternatively, to some predetermined sampling instant during) the total measurement period.

The edge detector and interpolator element 72 also outputs at 114 a logic signal ACCUMULATE that is applied to the EN (enable) inputs of each of the $F_{R'}$ clock-synchronized accumulating adders 94, 108. ACCUMULATE goes true—and thereby enables the data updating or accumulating functions performed by the adders 94, 108—a predeterminately fixed number of $F_{R'}$ cycles, as for example 4 cycles, after the UPDATE signal at output 74 goes true. This fixed time delay between the logical operating state changes of the UPDATE and ACCUMULATE signals provides a sufficient opportunity for the accumulating adders 94, 108 to settle or stabilize before the respective accumulator outputs P(n) are simultaneously updated.

The operation of the inventive method and arrangement for concurrently measuring, at each sampling or measurement instant, both relative changes in position and substantially the precise time at which the sample or position measurement is taken, should now be evident to those skilled in the art. With specific reference to the herein-disclosed embodiment of the reference phase counter/interpolator 70 that is illustrated in FIG. 3, the edge detector of element 72 defines the sampling instants by detecting the occurrence of the positive-going edge or zero crossing of each cycle of the $F_{m'}$ modified measurement signal waveform. The UPDATE output 74 of the element 72 goes true at each detected zero crossing to thereby enable the register 82 which latches the current contents of the counter 78. The UPDATE signal to the counter input 76 also presets the counter to decimal 15 (through the data "PC" applied at its input 84) to begin the next succeeding $F_{M'}$ cycle count sequence. Thus, one cycle of the fixed reference frequency clocking signal $F_{R'}$ is used to preset the counter, and each subsequent cycle of $F_{R'}$ decrements the counter by 1. When the movable or displaceable retroreflector 36 is at rest, and with M=16, N=5 and P=4, exactly 16 cycles of $F_{R'}$ will occur between positive-going zero crossings of $F_M$ and the counter contents will equal zero at each occurrence of UPDATE going true.

The contents of the latch 82, which represent integer changes in the number of cycles of $F_{R'}$ between successive sampling instants, are added in adder 88 to the low order bits from the interpolator of element 72, which represent fractional changes in $F_{R'}$ of less than one cycle, and thereby significantly increase the accuracy and resolution of the resulting position measurement. The $\Delta P(n)$ output 92 of adder 88 for a given sampling instant "n" is then added in the position data accumulating adder 72, when the ACCUMULATE signal from element 72 goes true, to the accumulated position change as of the immediately preceding "n−1" sampling instant. The resulting output P(n) represents the total updated change in the retroreflector position or in the length of the interferometer variable length path since the beginning of the measurement interval. The beginning of the measurement interval is usually defined by setting P(n) and T(n) to zero at a time instant corresponding to a positive-going edge of $F_{M'}$ and a user-supplied signal.

It should thus be recognized that the reference phase counter/interpolator 70 of FIG. 3 detects phase changes by continuously measuring the number of fixed frequency $F_{R'}$ cycles between positive-going edges or zero crossings of the phase-variable intermediate measurement signal $F_{M'}$ and adding the difference between that result and decimal 16 to an accumulator. When the interferometer retroreflector 36 is at rest, exactly 16 cycles of $F_{R'}$ occur between positive-going zero crossings of $F_{M'}$, the contents of counter 78 accordingly equals zero at each "true" occurrence of UPDATE, and P(n)=P(n−1). As the retroreflector moves, the phase of the interference signal $F_M$ changes and the phase of the intermediate measurement signal $F_{M'}$ changes by the same amount. With shifting of the phase of $F_{M'}$, the number of fixed frequency $F_{R'}$ cycles between successive cycles of $F_{M'}$ is no longer equal to 16 and the resulting difference is added to the accumulated position measurement data P(n−1). Thus, the time-variable phase measurement data is determined by relating it to the number of cycles of a fixed or controlled frequency signal, namely $F_{R'}$. This forms the basis of the improvement of the present invention by which a highly accurate and directly-derived determination of the time of each position data sample, and/or of the total elapsed time T(n) in the measurement interval or period, is provided, More particularly, the output 90 of latch 82 represents, as hereinabove pointed out, the difference (determined in the down counter 78) of decimal 16 and the measured number of cycles of the fixed frequency signal $F_{R'}$ between successive sampling instants—i.e. between positive-going zero crossings of $F_{M'}$. The time interval $\Delta T(n)$ between successive sampling instants is thus determined, in accordance with the invention, by subtracting the latch output 90 from decimal 16 in the subtracter 100, thereby providing a count of the number of cycles of the controlled frequency $F_{R'}$ between the two successive position change data samples "n" and "n−1". Since the frequency (and therefore the period) of $F_{R'}$ is both constant and known, the time interval between the two samples can be recovered directly from the count $\Delta T(n)$ through a straightforward calculation and with an unusually high degree of accuracy. And the total elapsed time T(n) since the beginning of the measurement period or interval is similarly recoverable by adding the most recent time change determination $\Delta T(n)$ from the output 104 of subtracter 100 to the total previously-accumulated time change data T(n−1) already present at the output 110 of the time data accumulating adder 108 when the adder 108 is next enabled by the logical ACCUMULATE signal from element 72. Here, again, a straightforward calculation based on the known, constant period of the signal $F_{R'}$ directly provides the total elapsed time using the newly-updated output 110 of the adder 108.

The present invention accordingly provides a highly accurate method and apparatus for determining, simultaneously with a position or length measurement, the precise time of that measurement. This is an important and highly advantageous improvement over prior art teachings. For example, prior art interferometer systems measure only changes of length or position and suffer significant loss of accuracy and measurement resolution with increasing velocity of position changes due to unvertainties in the position data output delay time resulting from, for example, variable processing delays in the system electronics. The disclosed interferometrically-based arrangement of the present invention, on the other hand, notably reduces uncertainty by recording the precise time at which the position measurement of interest is taken through use of the same underlying data, for determining the time interval, that is used for determining changes in length or position between sampling instants.

The present invention also facilitates the visualization or characterization of motion by providing both the position of the moving subject and the time at which the position was valid. Instantaneous or average velocity and higher order derivatives thereof can therefore be calculated to very high accuracies, and the accuracy of signal processing algorithms, such as Fourier transforms, is not degraded by sample timing errors.

The invention also enables highly accurate and consistent calibration of measurement data output delay during mass production operations so as to eliminate delay variations between individual interferometer systems being calibrated. This may, for example, be utilized to assure repeatability in process control machines that use the interferometer system as a transducer by compensating for known position data output delay time variations.

The invention further permits the use of a timebase for predictive process control on bodies in motion. Lower cost, higher accuracy and higher velocity machines, such as E-beam lithography machines that expose photosensitive films in motion, are rendered practical by the improvement of the present invention to a degree not heretofore attainable.

While there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, the interpolator of the element 72 (FIG. 3) of the inventive apparatus may be omitted, albeit with a corresponding decrease in the resolution of the changed and accumulated position data that is provided by the apparatus. Furthermore, the reference signal with respect to which phase changes of the measurement signal are quantitatively determined may be generated—by way of example at the frequency $f_o$ of the signal $F_R$, or at the frequency of the signal $F_{R'}$, or at any frequency selected or otherwise deemed suitable for its intended utility—separate from and independently of the oscillator 20 or any other electrical signal source that is associated with the interferometer 28 and/or its light beam source(s). These and numerous other modifications are within the fully intended scope and contemplation of the invention. It is the intention, therefore, to be limited only by the scope of the claims appended hereto.

What is claimed is:

1. An interferometer system, comprising:
reference means for providing a frequency stabilized reference electrical signal having a reference frequency;
light source means for providing a pair of orthogonally polarized optical beams having associated optical frequencies which differ in frequency from each other by said reference signal reference frequency;
means for directing one of said pair of optical beams along a fixed length optical path and for directing said other one of said pair of optical beams along a variable length optical path, and for outputting said beams after said beams have traversed said optical paths as interferometric output beams;
means coupled to said beam directing means for mixing said interferometric output beams;
means coupled to said mixing means for providing from said mixed interferometric output beams an electrical measurement signal having a phase that varies as a function of a change in length of said variable length optical path; and
means coupled to said measurement signal providing means and to said reference signal providing means for providing an output signal based on a difference in phase between said reference signal and said measurement signal;
said output signal providing means comprising:
means for detecting phase changes of said reference electrical signal between sampling instants defined by successive occurrences of a known phase of said electrical measurement signal; and
processing means for counting said phase changes detected by said phase change detecting means to generate a phase change count and for providing first data derived from said phase change count and proportional to a change in length of said variable optical path between said sampling instants, and second data derived from said phase change count and identifying a time interval between said sampling instants.

2. An interferometer system in accordance with claim 1, wherein said processing means comprises counting means for counting cycle-to-cycle occurrences of said reference signal between successive sampling instants and for providing at each said sampling instant a count of said cycle-to-cycle occurrences of said reference signal between said each sampling instant and a preceding sampling instant.

3. An interferometer system in accordance with claim 2, wherein said processing means further comprises:
means for accumulating said second data for a plurality of said sampling instants by adding together said cycle-to-cycle counts for each of said plural sampling instants to provide, as of a current sampling instant, an accumulated occurrence time for changes in said variable length path during said plural sampling instants.

4. An interferometer system in accordance with claim 2, wherein said phase detecting means further comprises edge detecting means for detecting occurrences of a predetermined, known phase of said electrical measurement signal.

5. An interferometer system in accordance with claim 4, wherein said edge detecting means comprises means for detecting a positive zero-crossing of each cycle of said electrical measurement signal so as to define each said occurrence of said predetermined, known phase of the measurement signal.

6. An interferometer system in accordance with claim 2, wherein said phase detecting means further comprises edge detecting means for detecting occurrences of a predetermined, known phase of said electrical measurement signal, and means for determining the phase of said reference electrical signal at each said detected known phase occurrence of said measurement signal.

7. An interferometer system in accordance with claim 6, wherein said edge detecting means comprises means for detecting a positive zero-crossing of each cycle of said electrical measurement signal so as to define each said occurrence of said predetermined, known phase of the measurement signal.

8. An interferometer system in accordance with claim 4, wherein said phase determining means further comprises interpolating means for determining a fractional cycle-to-cycle occurrence of said reference frequency between said successive sampling instants, and said processing means further comprises means for adding said determined fractional occurrence to said phase change count for use in deriving said first data proportional to a change in length of said variable optical path.

9. An interferometer system in accordance with claim 8, wherein said interpolating means comprises a Q-stage delay line having an input for receiving said electrical measurement signal and Q outputs spaced equally apart by 1/Q periods of said reference signal frequency.

10. An interferometer system in accordance with claim 9, wherein Q=8.

11. An interferometer system in accordance with claim 1, wherein said directing means comprises an interferometer, and said mixing means mixes said interferometric output beams after said output beams have traversed said interferometer.

12. An interferometer system in accordance with claim 11, wherein said interferometer comprises a polarization type interferometer.

13. An interferometer system in accordance with claim 1, wherein said reference means comprises a fixed frequency oscillator.

14. An interferometer system in accordance with claim 1, wherein said electrical measurement signal providing means comprises a photoelectric detector.

15. An interferometer system in accordance with claim 1, wherein said output signal providing means comprises a phasemeter/accumulator means.

16. An interferometer system in accordance with claim 1, wherein said phase change determining means comprises a reference phase counter/interpolator means.

17. An interferometer system in accordance with claim 1, wherein said output signal providing means further comprises first scaler means for scaling said reference electrical signal to provide a first scaled reference signal, means for applying said first scaled reference signal to said phase change determining means, second scaler means for further scaling said scaled reference signal to provide a second scaled reference signal, means for mixing said second scaled reference signal and said electrical measurement signal to produce a mixed measurement signal, and means for applying said mixed measurement signal to said phase change detecting means.

18. An interferometer system in accordance with claim 17, said mixed measurement signal applying means comprising filter means.

19. An interferometer system in accordance with claim 18, wherein said filter means comprises a low pass filter.

20. An interferometer system in accordance with claim 17, said mixed measurement signal applying means comprising filter means and limiting amplifier means for generating a digital signal in accordance with said mixed measurement signal.

21. An interferometer system in accordance with claim 20, wherein said filter means comprises a low pass filter.

22. An interferometer system in accordance with claim 1, wherein said output signal providing means further comprises first scaler means for scaling said reference electrical signal by M/N to provide a first scaled reference signal, means for applying said first scaled reference signal to said phase change determining means, second scaler means for further scaling said scaled reference signal by 1/P to provide a second scaled reference signal, means for mixing said second scaled reference signal and said electrical measurement signal to produce a mixed measurement signal, and means for applying said mixed measurement signal to said phase change detecting means, wherein M=16, N=5 and P=4.

23. An interferometer system in accordance with claim 22, said mixed measurement signal applying means comprising filter means.

24. A method of simultaneously determining, at a current sampling instant and with respect to a preceding sampling instant, a change of position of a movable object defining a variable length path and an elapsed time interval of the change of position, comprising the steps of:

generating a frequency stabilized reference electrical signal having a reference frequency;

providing a first radiant energy beam traversing a fixed length path and having a first frequency;

providing a second radiant energy beam traversing the variable length path and having a second frequency, said second energy beam being orthogonally polarized relative to said first energy beam and said first and second frequencies differing by said reference frequency;

mixing said first and second energy beams after said beams have traversed said fixed and variable length paths;

generating from the mixed first and second energy beams an electrical measurement signal having a phase that varies as a function of changes in length of the variable length path;

detecting phase changes of the reference electrical signal between the current and preceding sampling instants, said sampling instants being defined by time-spaced occurrences of a predetermined known phase of the electrical measurement signal;

counting said detected phase changes of the reference electrical signal to provide a count that is proportional to a change of length of the variable length path; and calculating from said count the elapsed time interval of said change of length of the variable length path between the current and preceding sampling instants.

25. A method in accordance with claim 24, further comprising the step of calculating from said count the change of length of the variable length path between the current and preceding sampling instants.

26. A method in accordance with claim 24, wherein said step of detecting phase changes comprises counting cycle-to-cycle occurrences of the reference signal between the current and preceding sampling instants and generating said count from said detected cycle-to-cycle occurrences.

27. A method in accordance with claim 26, wherein said count comprises the number of cycle-to-cycle occurrences of the reference signal between the current and preceding sampling instants, the reference signal has a wavelength periodicity, and said step of calculating the elapsed time interval comprises multiplying said count by the periodicity of the reference signal wavelength.

28. A method in accordance with claim 26, wherein said step of detecting phase changes further comprises detecting a positive-going zero crossing of each of two time-spaced cycles of the measurement signal to define said time-spaced sampling instants.

29. A method in accordance with claim 26, wherein said step of detecting phase changes further comprises detecting a positive-going zero crossing of each of a plurality of time-spaced cycles of the measurement signal to define said time-spaced sampling instants.

30. A method in accordance with claim 26, further comprising the step of scaling the reference frequency by a scale factor to provide a scaled reference signal having a scaled reference frequency, and said step of detecting phase changes comprising counting cycle-to-cycle occurrences of the scaled reference signal between the current and preceding sampling instants and generating said count from said detected cycle-to-cycle occurrences.

31. A method in accordance with claim 24, wherein said time-spaced occurrences defining said sampling instants comprise successive occurrences of a predetermined known phase of the electrical measurement signal.

32. A method in accordance with claim 24, wherein said step of detecting phase changes further comprises detecting the phase of the reference electrical signal at each time-spaced sampling instant.

33. A method in accordance with claim 24, further comprising the steps of:
scaling the reference frequency by a scale factor to provide a scaled reference signal having a scaled reference frequency; and
mixing the measurement signal and said scaled reference signal to provide an intermediate measurement signal; and wherein
said step of detecting phase changes comprises counting cycle-to-cycle occurrences of the scaled reference signal between the current and preceding sampling instants and generating said count from said detected cycle-to-cycle occurrences; and
said sampling instants being defined by time-spaced occurrences of a predetermined known phase of the intermediate measurement signal.

34. A method in accordance with claim 33, wherein said sampling instants are defined by successive-time-spaced occurrences of a predetermined known phase of the intermediate measurement signal.

35. A method in accordance with claim 33, wherein said step of providing the intermediate measurement signal further comprises low pass filtering the mixture of the measurement signal and scaled reference signal to provide the intermediate measurement signal.

36. A method in accordance with claim 35, wherein said step of providing the intermediate measurement signal further comprises amplifying the low pass filtered mixture of the measurement signal and scaled reference signal.

37. A method in accordance with claim 24, further comprising the steps of:
scaling the reference frequency by a first scale factor to provide a first scaled reference signal having a first scaled reference frequency;
scaling the reference frequency by a second scale factor to provide a second scaled reference signal having a second scaled reference frequency; and
mixing the measurement signal and said second scaled reference signal to provide an intermediate measurement signal; and wherein
said step of detecting phase changes comprises counting cycle-to-cycle occurrences of the first scaled reference signal between the current and preceding sampling instants and generating said count from said detected cycle-to-cycle occurrences; and
said sampling instants being defined by time-spaced occurrences of a predetermined known phase of the intermediate measurement signal.

38. A method in accordance with claim 37, wherein said sampling instants are defined by successive-time-spaced occurrences of a predetermined known phase of the intermediate measurement signal.

39. A method in accordance with claim 37, wherein said step of providing the intermediate measurement signal further comprises low pass filtering the mixture of the measurement signal and second scaled reference signal to provide the intermediate measurement signal.

40. A method in accordance with claim 39, wherein said step of providing the intermediate measurement signal further comprises amplifying the low pass filtered mixture of the measurement signal and scaled reference signal.

41. A method in accordance with claim 24, further comprising the step of providing an interferometer that defines the fixed and variable length paths traversed by the first and second radiant energy beams, the movable object being an element of the interferometer.

42. A method in accordance with claim 24, wherein said first and second radiant energy beams are optical beams.

* * * * *